US011025828B2

(12) United States Patent
Yasuma et al.

(10) Patent No.: US 11,025,828 B2
(45) Date of Patent: Jun. 1, 2021

(54) IMAGING CONTROL APPARATUS, IMAGING CONTROL METHOD, AND ELECTRONIC DEVICE

(71) Applicant: SONY CORPORATION, Tokyo (JP)

(72) Inventors: Fumihito Yasuma, Kanagawa (JP); Ryo Hirono, Kanagawa (JP); Keita Sasaki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 246 days.

(21) Appl. No.: 16/088,212

(22) PCT Filed: Feb. 20, 2017

(86) PCT No.: PCT/JP2017/006035
§ 371 (c)(1),
(2) Date: Sep. 25, 2018

(87) PCT Pub. No.: WO2017/169274
PCT Pub. Date: Oct. 5, 2017

(65) Prior Publication Data
US 2020/0304698 A1 Sep. 24, 2020

(30) Foreign Application Priority Data

Mar. 31, 2016 (JP) .............................. JP2016-070597

(51) Int. Cl.
*H04N 5/235* (2006.01)
(52) U.S. Cl.
CPC ................................. *H04N 5/2353* (2013.01)
(58) Field of Classification Search
CPC ........... H04N 5/355; H04N 7/18; G03B 15/00
See application file for complete search history.

(56) References Cited

U.S. PATENT DOCUMENTS

| | | | | |
|---|---|---|---|---|
| 2008/0170124 A1* | 7/2008 | Hatanaka | ........... | H04N 5/23248 348/208.4 |
| 2012/0038793 A1* | 2/2012 | Shimizu | ................. | H04N 5/353 348/231.99 |
| 2015/0296116 A1* | 10/2015 | Tsuzuki | ............. | H04N 5/23254 348/208.1 |

FOREIGN PATENT DOCUMENTS

| | | |
|---|---|---|
| JP | 2002-027328 A | 1/2002 |
| JP | 2010-178164 A | 8/2010 |

OTHER PUBLICATIONS

International Search Report and Written Opinion of PCT Application No. PCT/JP2017/006035, dated May 16, 2017, 06 pages of ISRWO.

* cited by examiner

*Primary Examiner* — Antoinette T Spinks
(74) *Attorney, Agent, or Firm* — Chip Law Group

(57) ABSTRACT

There is provided an imaging control apparatus including a control section that creates a first image by performing exposing to a pixel with first exposure by a first exposure time and creates a second image by performing exposing to a pixel with second exposure by a second exposure time in succession to the first image and a synthesizing section that synthesizes a synthesized image in which the first image and the second image have been synthesized and a selected image selected from either the first image or the second image. The control section decides the first exposure time and the second exposure time such that an image to be selected as the selected image in the synthesizing section is switched over on a basis of an exposure ratio being a ratio of an exposure time of the synthesized image and an exposure time of the selected image.

12 Claims, 10 Drawing Sheets

IMAGING CONTROL APPARATUS, IMAGING CONTROL METHOD, AND ELECTRONIC DEVICE

CROSS REFERENCE TO RELATED APPLICATIONS

This application is a U.S. National Phase of International Patent Application No. PCT/JP2017/006035 filed on Feb. 20, 2017, which claims priority benefit of Japanese Patent Application No. JP 2016-070597 filed in the Japan Patent Office on Mar. 31, 2016. Each of the above-referenced applications is hereby incorporated herein by reference in its entirety.

TECHNICAL FIELD

The present disclosure relates to an imaging control apparatus, an imaging control method, a computer program, and an electronic device.

BACKGROUND ART

In digital cameras equipped with a CCD image sensor or a CMOS image sensor, there are those that are equipped with a function of HDR (High Dynamic Range) to expand the width of a dynamic range. As a technique to image an HDR image, there is a method of creating an HDR image using a plurality of images having been imaged with respective exposure times different from each other (for example, refer to Patent Literature 1).

CITATION LIST

Patent Literature

Patent Literature 1: JP 2011-4353A

DISCLOSURE OF INVENTION

Technical Problem

In the case of creating an HDR image by synthesizing an image imaged with a long time exposure and an image imaged with a short time exposure, depending on a ratio of an exposure time, a blank occurs between imaging of images. In the case where an object being moving is included in a photographic subject, the moving photographic subject becomes unnatural at the time of creating an HDR image.

Then, in the present disclosure, an imaging control apparatus that is novel, has been improved, and can create an HDR image that is natural even in the case where an object being moving is included in a photographic subject, an imaging control method, a computer program, and an electronic device are proposed.

Solution to Problem

According to the present disclosure, there is provided an imaging control apparatus including: a control section that creates a first image by performing exposing to a pixel with first exposure by a first exposure time and creates a second image by performing exposing to a pixel with second exposure by a second exposure time in succession to the first image; and a synthesizing section that synthesizes a synthesized image in which the first image and the second image have been synthesized and a selected image selected from either the first image or the second image. The control section decides the first exposure time and the second exposure time such that an image to be selected as the selected image in the synthesizing section is switched over on a basis of an exposure ratio being a ratio of an exposure time of the synthesized image and an exposure time of the selected image.

In addition, according to the present disclosure, there is provided an imaging control method including: creating a first image by performing exposing to a pixel with first exposure by a first exposure time and creating a second image by performing exposing to a pixel with second exposure by a second exposure time in succession to the first image; synthesizing a synthesized image in which the first image and the second image have been synthesized and a selected image selected from either the first image or the second image; and deciding the first exposure time and the second exposure time such that an image to be selected as the selected image is switched over on a basis of an exposure ratio being a ratio of an exposure time of the synthesized image and an exposure time of the selected image.

In addition, according to the present disclosure, there is provided a computer program to make a computer execute: creating a first image by performing exposing to a pixel with first exposure by a first exposure time and creating a second image by performing exposing to a pixel with second exposure by a second exposure time in succession to the first image; synthesizing a synthesized image in which the first image and the second image have been synthesized and a selected image selected from either the first image or the second image; and deciding the first exposure time and the second exposure time such that an image to be selected as the selected image is switched over on a basis of an exposure ratio being a ratio of an exposure time of the synthesized image and an exposure time of the selected image.

In addition, according to the present disclosure, there is provided an electronic device including: the imaging control apparatus.

Advantageous Effects of Invention

As having described in the above, according to the present disclosure, it is possible to provide an imaging control apparatus that is novel, has been improved, and can create an HDR image that is natural even in the case where an object being moving is included in a photographic subject, an imaging control method, a computer program, and an electronic device.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
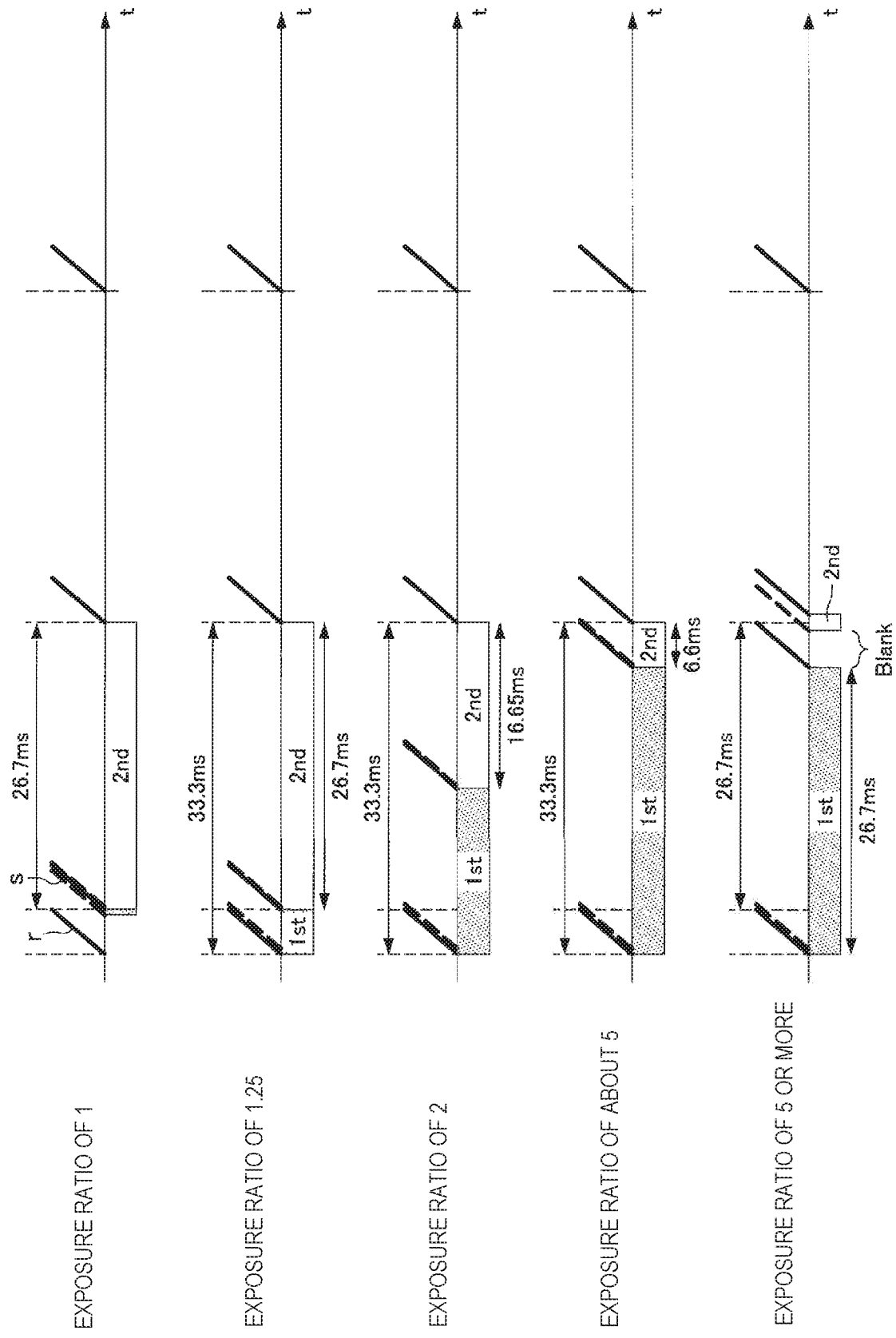
FIG. 1 is an explanatory diagrams for describing an existing imaging technique of an HDR image.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

It should be noted that description will be given in the following order.

1. Embodiment of present disclosure
1.1. Outline
1.2. Functional constitution example of imaging apparatus
1.3. Constitution example of sensor module
1.4. Operation example
2. Application example to movable objects
3. Conclusion

[1.1. Outline]

Before describing an embodiment of the present disclosure in detail, first, an outline of the embodiment of the present disclosure is described.

As mentioned in the above, in digital cameras equipped with a CCD image sensor or a CMOS image sensor, there is one equipped with a function of HDR that expands the width of a dynamic range. As a technique to image an HDR image, there is a method of creating an HDR image by using a plurality of sheets of images having been imaged by respective exposure times different from each other.

Figure 2:
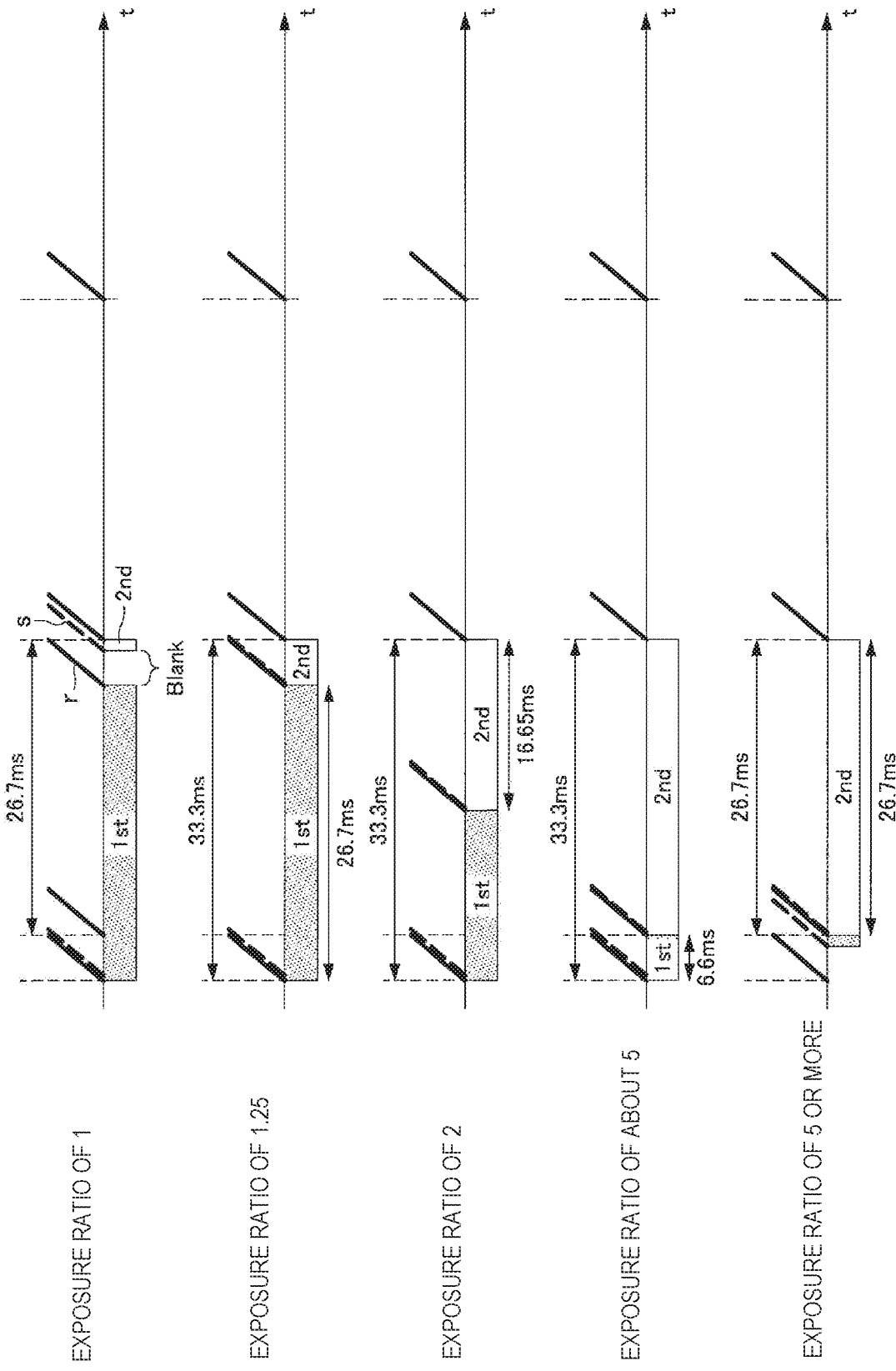
FIG. 2 is an explanatory diagrams for describing an existing imaging technique of an HDR image.

In the below, the existing imaging technique of an HDR image is described. FIG. 1 and FIG. 2 are explanatory diagrams for describing the existing imaging technique of an HDR image. In FIG. 1 and FIG. 2, shown are examples of creating an HDR image by imaging two sheets of images by respective exposure times different from each other or by the same exposure time. Moreover, in FIG. 1 and FIG. 2, shown is an examples in the case where an image (long accumulation image) by a long time exposure is created by adding two frames and any one of the frames used as the basis of the long accumulation image is made an image (short accumulation image) by a short time exposure.

In this connection, in the following description of the embodiment, among respective exposure times set separately for two sheets of images, a longer exposure time is referred to as a long exposure time, and a shorter exposure time is referred to as a short exposure time. Moreover, one sheet of an image obtained by exposing for a long exposure time is also referred to as a long exposure image, one sheet of an image obtained by exposing for a short exposure time is also referred to as a short exposure image, a pixel signal obtained by exposing for a long exposure time is also referred to as a long exposure signal, and a pixel signal obtained by exposing for a short exposure time is also referred to as a short exposure signal.

FIG. 1 exemplifies a relationship between an exposure ratio and an exposure timing in the case where a short accumulation image is fixed to the second frame. Herein, an exposure ratio represents an exposure time of a long accumulation image in the case where an exposure time of a short accumulation image is set to 1. That is, an exposure ratio of 2 represents "the exposure time of a long accumulation image: the exposure time of a short accumulation image=2:1".

From image sensors, such as a CMOS image sensor, in the case of including H rows of pixels in the vertical direction, data can be read out sequentially from the first row to the H-th row. However, unless the reading-out of data of the last H-th row has been ended, the reading-out of data of the first row of the next frame cannot be started.

For that reason, in the case where the output frame rate of images from an image sensor is 30 fps (a time per one frame is about 33.3 milliseconds), if an exposure ratio is going to be set to 5, the exposure time of the second frame may be set to 6.6 milliseconds. Moreover, in the case where a bright photographic subject and a dark photographic subject coexist, in order to display both of the photographic subjects appropriately in the image having been imaged, if an exposure ratio is going to be set to 5 or more, the exposure time of the second frame may be set to be shorter than 6.6 milliseconds. However, the exposure time of the first frame cannot be set to be longer than 26.7 milliseconds due to the above-mentioned restriction in the reading-out. Therefore, in the case of having fixed a short accumulation image to the second frame, if an exposure ratio is going to be set to 5 or more, a blank occurs between the first frame and the second frame. If a blank occurs between the first frame and the second frame, in the case where a photographic subject includes a moving object, at the time of creating an HDR image, the moving photographic subject becomes unnatural.

FIG. 2 exemplifies a relationship between an exposure ratio and an exposure timing in the case of having fixed a short accumulation image to the first frame.

If a short accumulation image is fixed to the first frame, in the case where the output frame rate of images from an image sensor is 30 fps, if an exposure ratio is going to be set to 1.25, the exposure time of the second frame may be set to 6.6 milliseconds. Moreover, in the case where a bright photographic subject and a dark photographic subject coexist, in order to display both of the photographic subjects appropriately in the image having been imaged, if an exposure ratio is going to be set to 1.25 or less, the exposure time of the second frame may be set to be shorter than 6.6 milliseconds. However, the exposure time of the first frame cannot be set to be longer than 26.7 milliseconds due to the above-mentioned restriction in the reading-out. Therefore, in the case of having fixed a short accumulation image to the first frame, if an exposure ratio is going to be set to 1.25 or less, a blank occurs between the first frame and the second frame. If a blank occurs between the first frame and the second frame, in the case where a photographic subject includes a moving object, at the time of creating an HDR image, the moving photographic subject becomes unnatural.

Then, in view of the above-mentioned contents, the present disclosers have studied diligently a technique that can create an HDR image such that a photographic subject does not become an unnatural image depending on an exposure ratio at the time of creating an HDR image. As a result, as described in the below, the present disclosers have come to devise a technique that can create an HDR image such that a photographic subject does not become an unnatural image depending on an exposure ratio at the time of creating an HDR image.

In the above, the outline of the embodiment of the present disclosure has been described.

[1.2. Functional Constitution Example]

Figure 3:
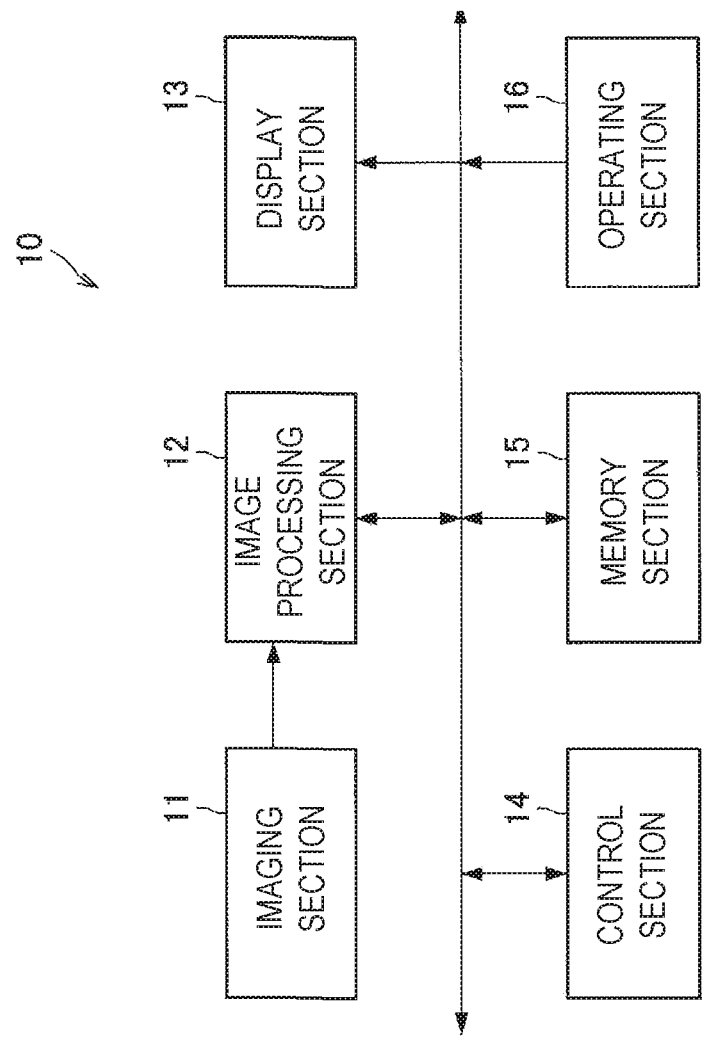
FIG. 3 is an explanatory diagram showing a functional constitution example of an electronic device 10 according to an embodiment of the present disclosure.

Successively, a functional constitution example of an electronic device according to an embodiment of the present disclosure is described. FIG. 3 is an explanatory diagram showing a functional constitution example of the electronic device 10 according to the embodiment of the present disclosure. Hereinafter, the functional constitution example of the electronic device 10 according to the embodiment of the present disclosure is described using FIG. 3.

As shown in FIG. 3, the electronic device 10 according to the embodiment of the present disclosure includes an imaging section 11, an image processing section 12, a display section 13, a control section 14, a memory section 15, and an operating section 16.

The imaging section 11 includes a lens, a sensor module, etc., and accumulates electrons during a predetermined period correspondingly to an image formed on a light receiving surface of a sensor module through a lens. The imaging section 11 performs predetermined signal processing for signals corresponding to the accumulated electrons. Moreover, the imaging section 11 outputs the signals after having performed the signal processing, to the image processing section 12. In this connection, a constitution of the sensor module included in the imaging section 11 will be described in detail later.

The imaging section 11 may execute, as the above-described predetermined signal processing, such as a hand shake correcting process by an electronic hand shake correcting system, an automatic white balancing process, an automatic exposing process, a distortion correcting process, a defect correcting process, a noise reducing process, and a high dynamic range synthesizing process.

The image processing section 12 includes, for example, an application processor (AP), and executes image processing using signals output from the imaging section 11. Image processing executed by the image processing section 12 includes, for example, a demosaic process using signals output from the imaging section 11, a display process to display an image after the demosaic process on the display section 13, and a memory process to the memory section 15.

The display section 13 is a display device including, for example, a liquid crystal display, an organic EL display, or the like. In the display section 13, display contents are controlled by the control section 14. For example, the display section 13 displays an image that has been imaged by the imaging section 11 and has been subjected to the image processing by the image processing section 12, on the basis of the control of the control section 14.

The control section 14 includes, for example, a processor, such as a CPU (Central Processing Unit), a ROM, a RAM, and so on, and controls operation of each section of the electronic device 10.

The memory section 15 includes, for example, memory media, such as a flash memory and other nonvolatile memories. The memory section 15 memorizes an image that has been imaged by the imaging section 11 and has been subjected to the image processing by the image processing section 12. The image memorized in the memory section 15 may be displayed on the display section 13 correspondingly to the operation of a user of the electronic device 10.

The operating section 16 is a device for operation of the electronic device 10, and includes, for example, a button, a touch panel, and so on. In the case where the operating section 16 includes a touch panel, the touch panel is disposed on the display surface of the display section 13. In the case where a user of the electronic device 10 wants to record an image imaged by the imaging section 11 in the electronic device 10, the user generates a shutter trigger by operating a predetermined button of the operating section 16. Upon detection of the occurrence of the shutter trigger, the imaging section 11 or the image processing section 12 execute processing for recording an image in the electronic device 10 in response to the occurrence of the shutter trigger.

The electronic device 10 shown in FIG. 3 should not be limited to a specific device, and may take various configurations, such as a digital camera, a smart phone, a tablet type portable terminal, a portable music reproducing apparatus, and a game machine.

In the above, the functional constitution example of the electronic device 10 according to the embodiment of the present disclosure has been described. Successively, description is given for a constitution example of an image sensor included in the imaging section 11 of the electronic device 10 according to the embodiment of the present disclosure.

[1.3. Constitution Example of Sensor Module]

Figure 4:
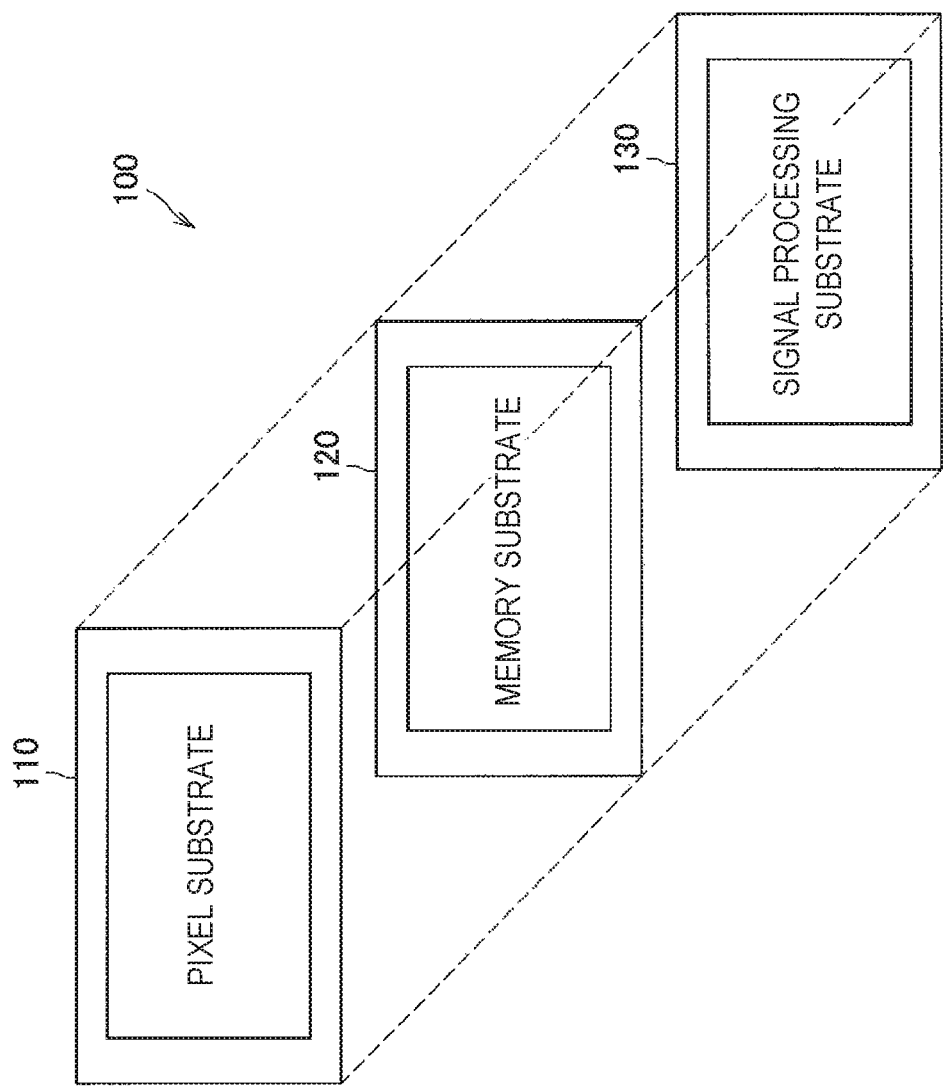
FIG. 4 is an explanatory illustration showing a constitution example of a sensor module 100 included in an imaging section 11.

FIG. 4 is an explanatory illustration showing a constitution example of a sensor module 100 included in the imaging section 11. The sensor module 100 according to the embodiment of the present disclosure is one example of an image processing apparatus of the present disclosure, and as shown in FIG. 4, includes three stacked substrates. The sensor module 100 according to the embodiment of the present disclosure includes a pixel substrate 110, a memory substrate 120, and a signal processing substrate 130 that are stacked in this order.

The pixel substrate 110 is a substrate that includes an image sensor including a pixel region in which unit pixels are formed in an array form. Each unit pixel receives light from a photographic subject, photoelectrically converts the incidence light, accumulates electric charges, and outputs the electric charges as a pixel signal at a predetermined timing. The pixel signals output from the pixel substrate 110 are stored in the memory substrate 120, and are subjected to signal processing in the signal processing substrate 130. In this connection, the pixel substrate 110 includes an AD converter to convert an analog signal into a digital signal. That is, the pixel signal output from the pixel substrate 110 is a digital signal.

The memory substrate 120 is a substrate that includes a memory, such as a DRAM (Dynamic Random Access Memory) to store temporarily pixel signals output from the pixel substrate 110. The memory substrate 120 has a capacity capable of storing temporarily pixel signals of a plurality of frames, for example, frames enough for executing a hand shake correcting process by an electronic type hand shake correcting system in the signal processing substrate 130. The pixel signals stored in the memory substrate 120 are read out on the basis of a read-out instruction from the signal processing substrate 130.

The signal processing substrate 130 executes various kinds of signal processing for the pixel signals stored in the memory substrate 120. The signal processing executed by the signal processing substrate 130 is signal processing with regard to image quality for the pixel signals stored in the memory substrate 120. For example, it is possible to execute signal processing, such as a hand shake correcting process by an electronic type hand shake correcting system, an automatic white balance process, an automatic exposure process, a distortion correcting process, a defect correcting process, a noise reducing process, and a high dynamic range synthesizing process.

In this connection, FIG. 4 shows an illustration of a constitution of the sensor module 100 where the pixel substrate 110, the memory substrate 120, and the signal processing substrate 130 are stacked in this order. However, the present disclosure should not be limited to such an example. For example, the sensor module 100 may have a constitution where the pixel substrate 110, the signal processing substrate 130, and the memory substrate 120 are stacked in this order.

In the above, the constitution example of the sensor module 100 has been described using FIG. 4. Successively, a functional constitution example of the sensor module 100 will be described.

Figure 5:
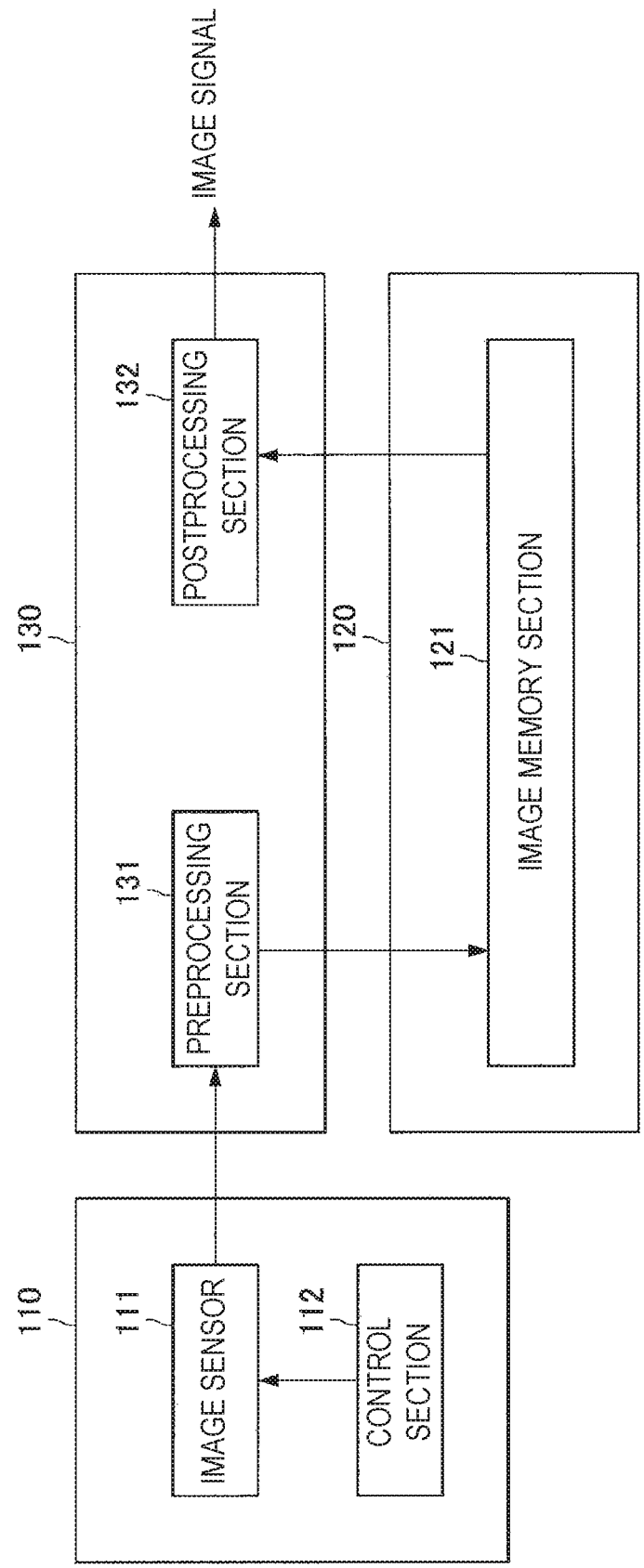
FIG. 5 is an explanatory diagram showing a functional constitution example of a sensor module 100 according to an embodiment of the present disclosure.

FIG. 5 is an explanatory diagram showing a functional constitution example of the sensor module 100 according to the embodiment of the present disclosure. Hereinafter, the functional constitution example of the sensor module 100 according to the embodiment of the present disclosure will be described using FIG. 5.

The pixel substrate 110 includes the image sensor 111 including a pixel region where unit pixels are formed in an array form and a control section 112 that supplies predetermined clock signals and timing signals to the image sensor 111. The pixel signals output from the image sensor 111 correspondingly to signals from the control section 112 are sent once to the signal processing substrate 130, and thereafter, are sent to the memory substrate 120.

In the present embodiment, the control section 112 supplies a timing signal to the image sensor 111 such that two exposure signals are output from the image sensor 111 so as not to cause a blank between frames at the time of imaging an HDR image. Furthermore, the control section 112 supplies a timing signal to the image sensor 111 so as to become an exposure ratio set at the time of imaging an HDR image.

The memory substrate 120 includes an image memory section 121 including a DRAM (Dynamic Random Access Memory), and so on. The image memory section 121 stores temporarily pixel signals output from the image sensor 111. The image memory section 121 has a capacity capable of storing temporarily pixel signals of a plurality of frames. The pixel signals stored in the image memory section 121 are read out on the basis of a read-out instruction from the signal processing substrate 130.

The signal processing substrate 130 includes a preprocessing section 131 and a post processing section 132.

The preprocessing section 131 applies signal processing for pixel signals output from the image sensor 111. The preprocessing section 131 makes the image memory section 121 memorize the pixel signals after having applied the signal processing. The signal processing executed by the preprocessing section 131 may include, for example, a gain adjusting process, a clamping process, a pixel adding process, and so on.

The post processing section 132 executes signal processing for the pixel signals memorized in the image memory section 121. Upon executing the signal processing for the pixel signals memorized in the image memory section 121, the post processing section 132 outputs the pixel signals after the signal processing to the image processing section 12. The signal processing executed by the post processing section 132 may include, for example, an automatic white balance process, an automatic exposure process, a distortion correcting process, a defect correcting process, a noise reducing process, a high dynamic range synthesizing process, and the like. Moreover, the post processing section 132 can perform the synthesizing process of images imaged in a plurality of frames.

In the present embodiment, at the time of creating an HDR image, the post processing section 132 uses, as a long accumulation image, one created by frame-synthesizing long time exposure and short exposure image output from the image sensor 111. Moreover, the post processing section 132 decides correspondingly to an exposure ratio, as a short accumulation image, whether to use an image based on an exposure signal of the first frame, or whether to use an image based on an exposure signal of the second frame. Therefore, the post processing section 132 may function as one example of the control section and the synthesizing section of the present disclosure.

By having such a constitution, the sensor module 100 according to the embodiment of the present disclosure can create an HDR image such that a photographic subject does not become an unnatural image depending on an exposure ratio at the time of creating an HDR.

In the above, the functional constitution example of the sensor module 100 according to the embodiment of the present disclosure has been described.

[1.4. Operation Example]

Figure 6:
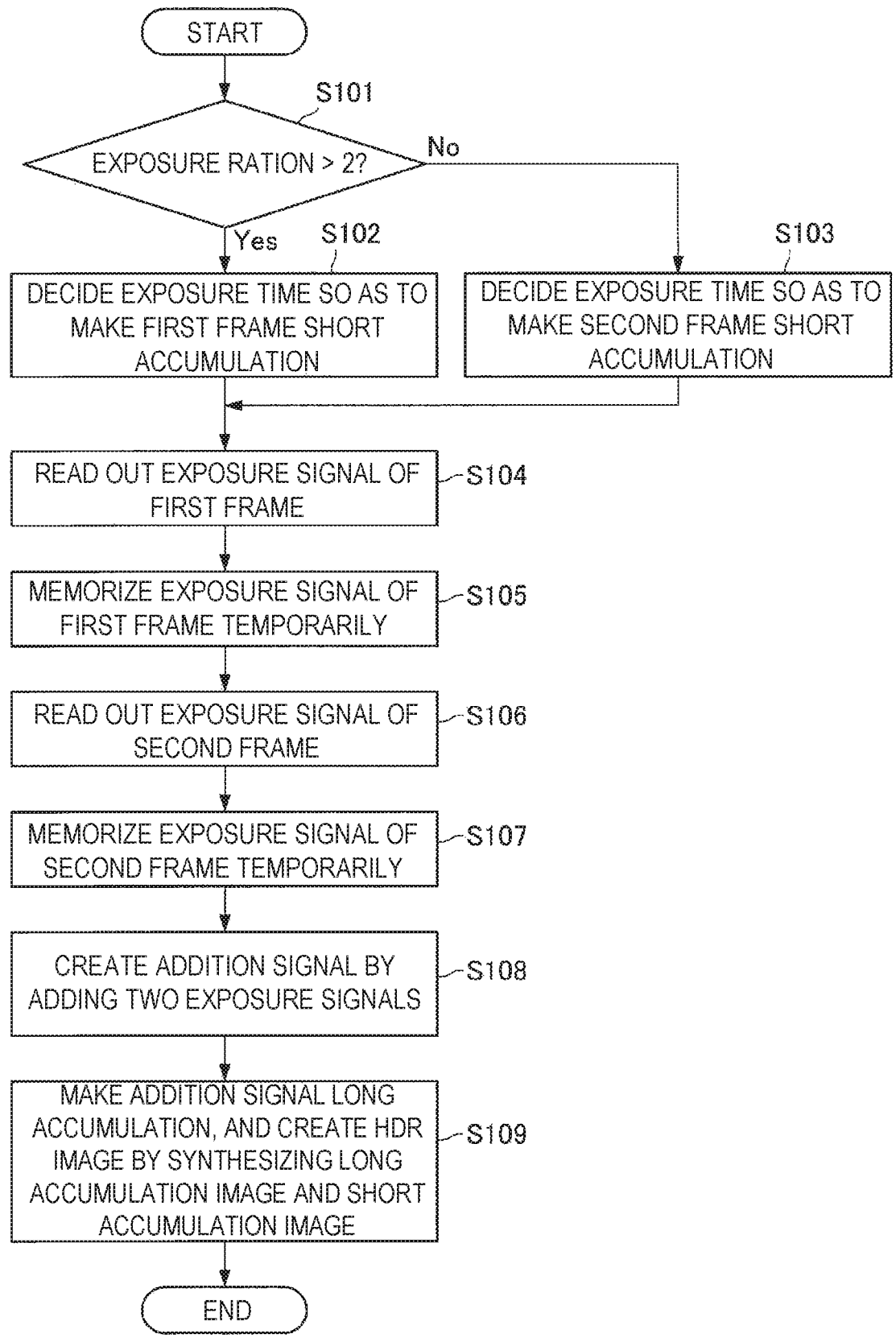
FIG. 6 is a flow diagram showing an operation example of a sensor module 100 according to an embodiment of the present disclosure.

Successively, an operation example of the sensor module 100 according to the embodiment of the present disclosure is described. FIG. 6 is a flow diagram showing an operation example of the sensor module 100 according to the embodiment of the present disclosure. The diagram shown in FIG. 6 is a flow diagram of the sensor module 100 according to the embodiment of the present disclosure at the time of creating an HDR image. Hereinafter, an operation example of the sensor module 100 according to the embodiment of the present disclosure according to the embodiment of the present disclosure is described using FIG. 6.

The sensor module 100 according to the embodiment of the present disclosure determines, at the time of creating an HDR image, whether an exposure ratio of a long accumulation image and a short accumulation image becoming a basis of an HDR image is larger than two (Step S101). The determining process in Step S101 is executed by, for example, the control section 112.

As a result of the determination in Step S101, in the case where an exposure ratio of the long accumulation image and the short accumulation image becoming a basis of an HDR image is larger than 2 (Step S101, Yes), successively, the sensor module 100 decides the exposure time of the first frame and the second frame such that the exposure signal of the first frame is made a short accumulation image (Step S102). The deciding process in Step S102 is executed by, for example, the control section 112.

On the other hand, as a result of the determination in Step S101, in the case where an exposure ratio of the long accumulation image and the short accumulation image becoming a basis of an HDR image is two or less (Step S101, No), successively, the sensor module 100 decides the exposure time of the first frame and the second frame such that the exposure signal of the second frame is made a short accumulation image (Step S103). The deciding process in Step S103 is executed by, for example, the control section 112.

Upon decision of the exposure time of the first frame and the second frame, successively, the sensor module 100 exposes the image sensors 111 by the exposure time decided in Step S102 or Step S103, and reads out the exposure signals of the first frame from the image sensors 111 (Step S104). The process in Step S104 is executed by, for example, an operation that the control section 112 supplies a signal to read out an exposure signal to the image sensors 111.

Upon reading out the exposure signal of the first frame from the image sensors 111, successively, the sensor module 100 memorizes temporarily the read-out exposure signal of the first frame in the image memory section 121 (Step S105). In the case where an exposure ratio is larger than two, this exposure signal of the first frame becomes a short accumulation image.

Upon memorizing temporarily the read-out exposure signal of the first frame in the image memory section 121, successively, the sensor module 100 exposes the image sensors 111 by the exposure time decided in Step S102 or Step S103, and reads out the exposure signals of the second frame from the image sensors 111 (Step S106). The process in Step S106 is executed by, for example, an operation that the control section 112 supplies a signal to read out an exposure signal to the image sensors 111.

Upon reading out the exposure signal of the second frame from the image sensors 111, successively, the sensor module 100 memorizes temporarily the read-out exposure signal of the second frame in the image memory section 121 (Step S107). In the case where an exposure ratio is two or less, this exposure signal of the second frame becomes a short accumulation image.

Upon memorizing temporarily the read-out exposure signal of the second frame in the image memory section 121, successively, the sensor module 100 acquires the exposure signal of the first frame and the exposure signal of the second frame memorized in the image memory section 121, and creates an addition signal by adding the acquired exposure signal of the first frame and the acquired exposure signal of the second frame (Step S108). The creating process of the addition signal in Step S105 is executed by, for example, the post processing section 132. Upon creating the addition signal, the sensor module 100 memorizes the created addition signal temporarily in the image memory section 121.

Upon creating the addition signal, successively, the sensor module 100 makes the addition signal created in Step S108 a long accumulation image, and creates an HDR image by synthesizing the long accumulation image and the short accumulation image (Step S109). The creating process of the HDR image in Step S109 is executed by, for example, the post processing section 132.

By executing such operations, the sensor module 100 according to the embodiment of the present disclosure can create an HDR image such that a photographic subject does not become an unnatural image depending on an exposure ratio at the time of creating an HDR.

Here, description is given for the reason why processing is separated in Step S106 in a series of the above-mentioned processes depending on whether an exposure ratio of a long accumulation image and a short accumulation image is larger than two.

Figure 7:
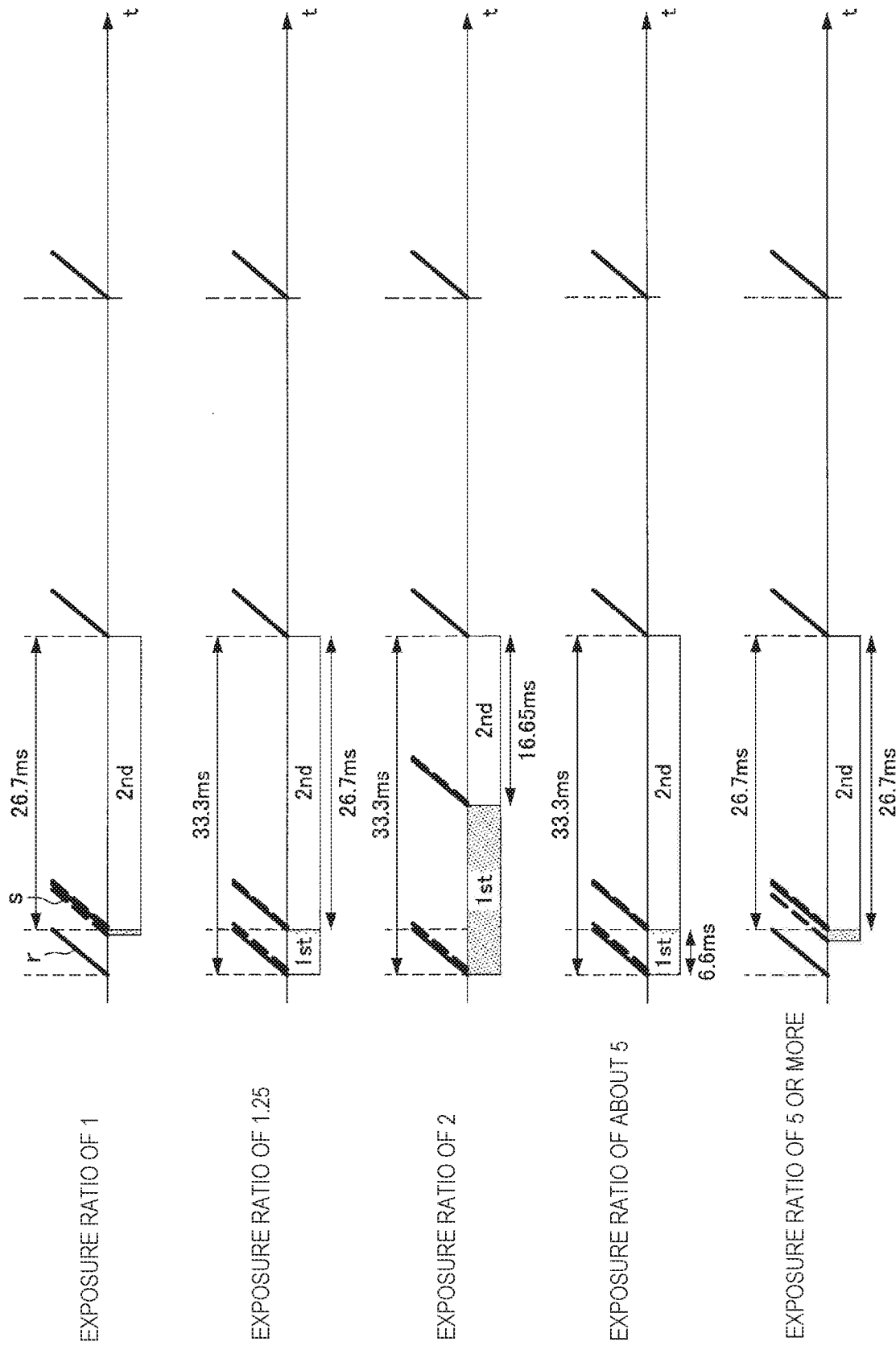
FIG. 7 is an explanatory diagram showing a selection example of a short accumulation image by an exposure ratio.

FIG. 7 is an explanatory diagram showing a selection example of a short accumulation image by an exposure ratio at the time of creating an HDR image by the sensor module 100 according to the embodiment of the present disclosure. In the examples shown in FIG. 7, any of them performs exposing such that there is no idle time between the first frame and the second frame.

In the case where an exposure ratio is two or less, the sensor module 100 selects the exposure signal of the second frame to a short accumulation image. On the other hand, in the case where an exposure ratio exceeds two, the sensor module 100 selects the exposure signal of the first frame to a short accumulation image.

In this way, by switching over a frame to be selected as a short accumulation image depending on a case where an exposure ratio is two or less and a case where an exposure ratio exceeds two, the sensor module 100 can prevent a blank from occurring on the first frame and the second frame at the time of creating a long accumulation image. Namely, by switching over a frame to be selected as a short accumulation image depending on a case where an exposure ratio is two or less and a case where an exposure ratio exceeds two, the sensor module 100 according to the embodiment of the present disclosure can create an HDR image such that a photographic subject does not become an unnatural image depending on an exposure ratio at the time of creating an HDR.

In this connection, in the above-mentioned example, although the sensor module 100 switches over a frame to be selected as a short accumulation image depending on a case where an exposure ratio is two or less and a case where an exposure ratio exceeds two, the exposure ratio to switch over a frame to be selected as a short accumulation image should not be limited to such an example.

Moreover, in the above-mentioned example, although the sensor module 100 switches over a frame to be selected as a short accumulation image depending on a case where an exposure ratio is two or less and a case where an exposure ratio exceeds two, in a situation where an exposure ratio becomes around two due to the brightness of a photographing subject, a frame to be selected as a short accumulation image is switched over frequently. If a frame to be selected as a short accumulation image is switched over frequently, in the case where a moving subject is included in an HDR image to be created, the direction of blur of the photographic subject is switched over frequently.

Then, in order to avoid a situation that a frame to be selected as a short accumulation image is switched over frequently, the sensor module 100 may provide hysteresis for the switching-over of a frame to be selected as a short accumulation image in the neighborhood of an exposure ratio at which a frame to be selected as a short accumulation image is switched over. For example, in the case where the exposure ratio changes in the direction to become large, when the exposure ratio has become, for example, 2.1 times, not two times, the sensor module 100 may decide to make the exposure signal of the first frame a short accumulation image, and in the case where the exposure ratio changes in the direction to become small, when the exposure ratio has become, for example, 1.9 times, not two times, the sensor module 100 may decide to make the exposure signal of the second frame a short accumulation image.

In this way, by providing hysteresis for the switching-over of a frame to be selected as a short accumulation image in the neighborhood of an exposure ratio at which a frame to be selected as a short accumulation image is switched over, the sensor module 100 can avoid a situation that a frame to be selected as a short accumulation image is switched over frequently.

Figure 8:
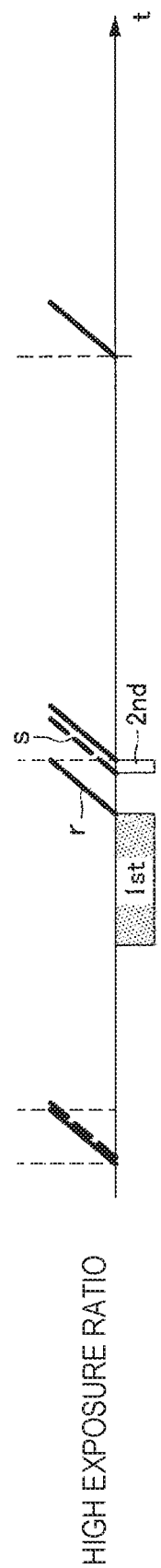
FIG. 8 is an explanatory diagram showing an example where exposing for two frames is performed in an extremely short time.

Depending on the condition of an exposure time, unless exposing is performed in an extremely short time, a photographic subject may be whitened. Moreover, depending on the condition of as exposure time, a blank may occur between the first frame and the second frame. For example, it is a case where a read time of the first frame and an exposure time of the second frame overlap with each other. FIG. 8 is an explanatory diagram showing an example where the exposing for two frames is performed in an extremely short time. For example, in the case where an exposure ratio is high, the sensor module 100 makes the first frame a short accumulation image. However, as shown in FIG. 8, if a blank occurs between the first frame and the second frame, in the case where a photographic subject with movement is included in an image used as a long accumulation image, the photographic subject becomes unnatural.

Then, in the case where a blank occurs between the first frame and the second frame depending on the condition of an exposure time, the sensor module 100 may output only a short accumulation image without synthesizing a long accumulation image and a short accumulation image. By refraining from synthesizing a long accumulation image and a short accumulation image depending on the condition of an exposure time, the sensor module 100 can create an image in which a photographic subject does not become unnatural even in the case of imaging a photographic subject with movement.

2. Application Example to Mobile Objects

The technology (present technology) according to an embodiment of the present disclosure is applicable to a variety of products. For example, the technology according to an embodiment of the present disclosure is implemented as devices mounted on any type of mobile objects such as automobiles, electric vehicles, hybrid electric vehicles, motorcycles, bicycles, personal mobilities, airplanes, drones, ships, and robots.

Figure 9:
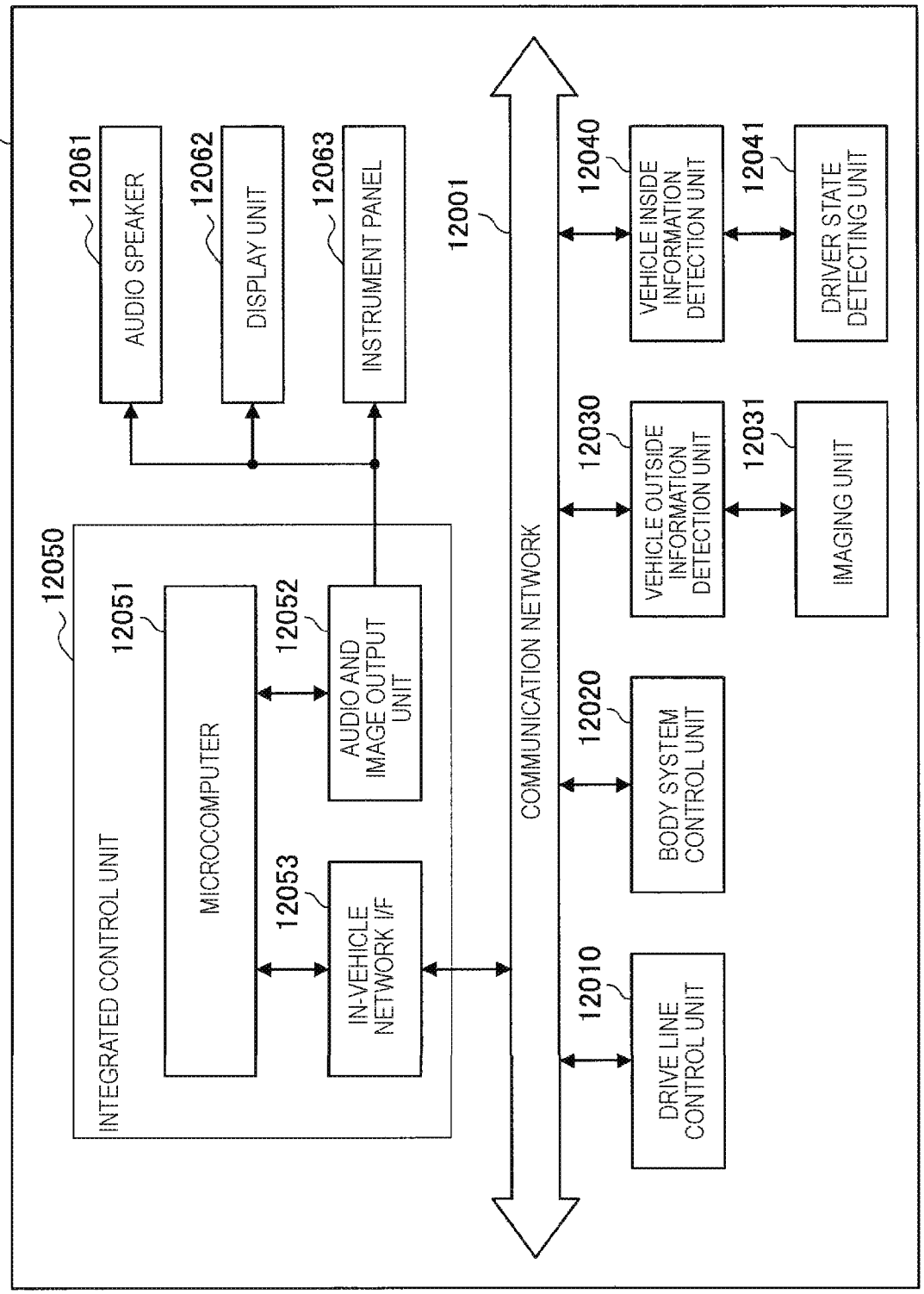
FIG. 9 is a block diagram showing one example of a schematic configuration of a vehicle control system

FIG. 9 is a block diagram illustrating a schematic configuration example of a vehicle control system which is an example of a mobile object control system to which a technology according to an embodiment of the present technology is applicable.

A vehicle control system 12000 includes a plurality of electronic control units connected via a communication network 12001. In the example illustrated in FIG. 9, the vehicle control system 12000 includes a drive line control unit 12010, a body system control unit 12020, a vehicle outside information detection unit 12030, a vehicle inside information detection unit 12040, and an integrated control unit 12050. In addition, as functional configurations of the integrated control unit 12050, a microcomputer 12051, an audio and image output unit 12052, an in-vehicle network interface (I/F) 12053.

The drive line control unit 12010 controls the operation of devices related to the drive line of the vehicle in accordance with a variety of programs. For example, the drive line control unit 12010 functions as a control device for a driving force generating device such as an internal combustion engine or a driving motor that generates the driving force of the vehicle, a driving force transferring mechanism that transfers the driving force to wheels, a steering mechanism that adjusts the steering angle of the vehicle, a braking device that generates the braking force of the vehicle, and the like.

The body system control unit 12020 controls the operations of a variety of devices attached to the vehicle body in accordance with a variety of programs. For example, the body system control unit 12020 functions as a control device for a keyless entry system, a smart key system, a power window device, or a variety of lights such as a headlight, a backup light, a brake light, a blinker, or a fog lamp. In this case, the body system control unit 12020 can receive radio waves transmitted from a portable device that serves instead of the key or signals of a variety of switches. The body system control unit 12020 receives these radio waves or signals, and controls the vehicle door lock device, the power window device, the lights, or the like.

The vehicle outside information detection unit 12030 detects information regarding the outside of a vehicle on which the vehicle control system 12000 is mounted. For example, an imaging unit 12031 is connected to the vehicle outside information detection unit 12030. The vehicle outside information detection unit 12030 causes the imaging unit 12031 to capture an image outside of the vehicle and receives the captured image. The vehicle outside information detection unit 12030 may perform an object detection process or a distance detection process for a person, a vehicle, an obstacle, a sign, letters on a road, or the like on the basis of the received image.

The imaging unit 12031 is a light sensor that receives light and outputs an electric signal in accordance with the amount of received light. The imaging unit 12031 can output the electric signal as an image or distance measurement information. In addition, the light received by the imaging unit 12031 may be the visible light or may be non-visible light such as infrared light.

The vehicle inside information detecting unit 12040 detects information regarding the inside of the vehicle. The vehicle inside information detecting unit 12040 is connected, for example, to a driver state detecting unit 12041 that detects the state of the driver. The driver state detecting unit 12041 may include, for example, a camera that images the driver. The vehicle inside information detecting unit 12040 may compute the degree of the driver's tiredness or the degree of the driver's concentration or determine whether the driver have a doze, on the basis of detection information input from the driver state detecting unit 12041.

For example, the microcomputer 12051 can calculate a control target value of the driving force generating device, the steering mechanism, or the braking device on the basis of information acquired by the vehicle outside information detecting unit 12030 or the vehicle inside information detecting unit 12040 on the inside and outside of the vehicle, and output a control instruction to the drive line control unit 12010. For example, the microcomputer 12051 may perform cooperative control for the purpose of executing the functions of an advanced driver assistance system (ADAS) including vehicle collision avoidance or impact reduction, follow-up driving based on the inter-vehicle distance, constant vehicle speed driving, vehicle collision warning, vehicle lane departure warning, or the like.

Further, the microcomputer 12051 can control the driving force generating device, the steering mechanism, the braking device, or the like on the basis of information acquired by the vehicle outside information detecting unit 12030 or the vehicle inside information detecting unit 12040 on the areas around the vehicle, thereby performing cooperative control for the purpose of automatic driving or the like that allows the vehicle to autonomously travel irrespective of any operation of a driver.

In addition, the microcomputer 12051 can output a control instruction to the body system control unit 12020 on the basis of the information regarding the outside of the vehicle acquired by the vehicle outside information detection unit 12030. For example, the microcomputer 12051 can control a head lamp in accordance with the position of a preceding vehicle or an oncoming vehicle detected by the vehicle outside information detection unit 12030 and can perform cooperative control for the purpose of anti-glaring such as switching a high beam to a low beam.

The audio and image output unit 12052 transmits an output signal of at least one of a sound and an image to an output device capable of visually or aurally notifying a passenger of the vehicle or the outside of the vehicle of information. In the example of FIG. 9, an audio speaker 12061, a display unit 12062, and an instrument panel 12063 are exemplified as the output device. For example, the display unit 12062 may include at least one of an onboard display and a head-up display.

Figure 10:
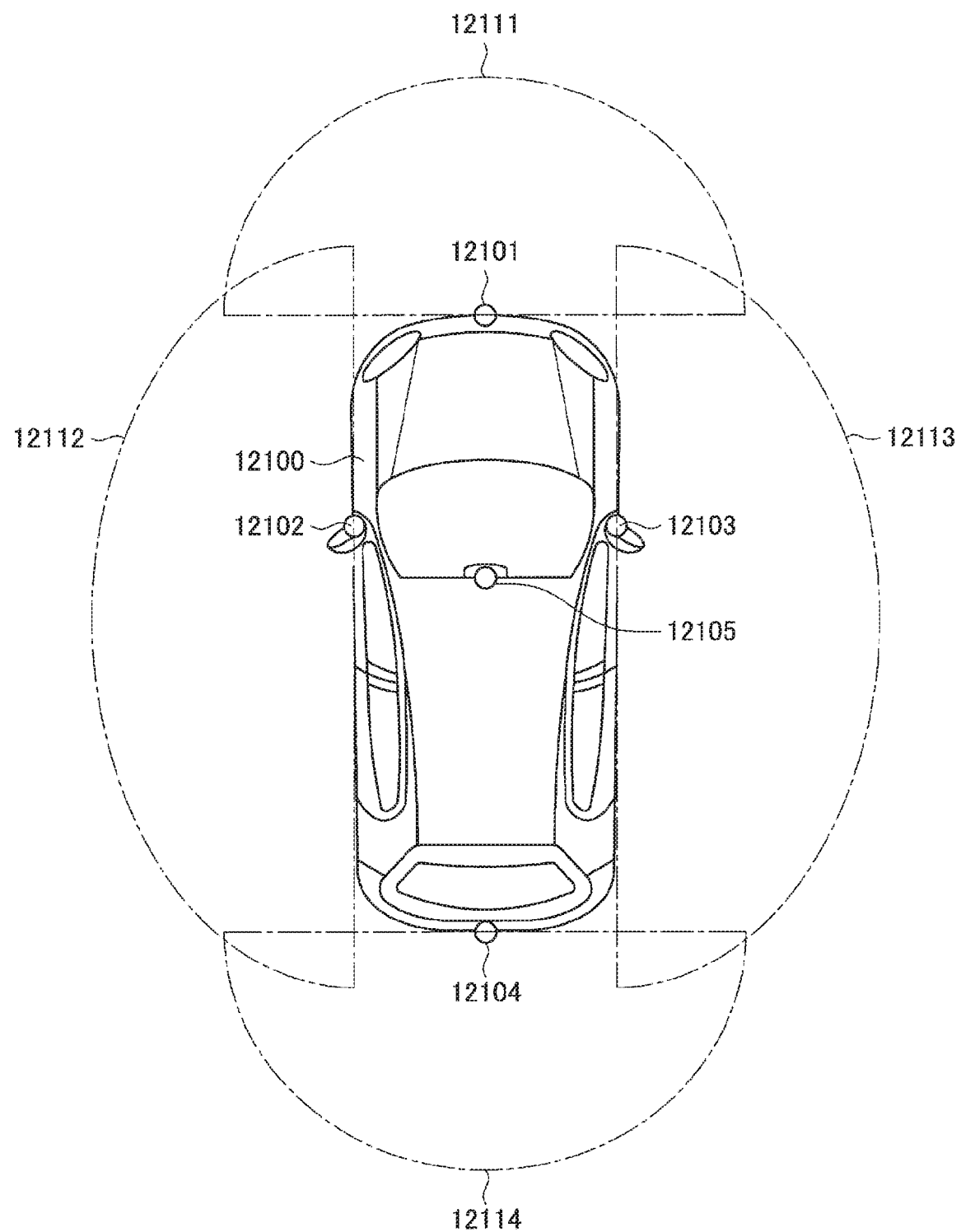
FIG. 10 is an explanatory diagram showing one example of an installation position of a vehicle outside information detecting section and an imaging section.

FIG. 10 is a diagram illustrating an example of an installation position of the imaging unit 12031.

In FIG. 10, the vehicle 12100 includes imaging units 12101, 12102, 12103, 12104, and 12105 as the imaging unit 12031.

Imaging units 12101, 12102, 12103, 12104, and 12105 are positioned, for example, at the front nose, a side mirror, the rear bumper, the back door, and the upper part of the windshield in the vehicle compartment of a vehicle 12100. The imaging unit 12101 attached to the front nose and the imaging unit 12105 attached to the upper part of the windshield in the vehicle compartment chiefly acquire images of the area ahead of the vehicle 12100. The imaging units 12102 and 12103 attached to the side mirrors chiefly acquire images of the areas on the sides of the vehicle 12100. The imaging unit 12104 attached to the rear bumper or the back door chiefly acquires images of the area behind the vehicle 12100. A front image acquired by the imaging units 12101 and 12105 is used chiefly to detect a preceding vehicle, a pedestrian, an obstacle, a traffic light, a traffic sign, a lane, or the like.

Additionally, FIG. 10 illustrates an example of the imaging ranges of the imaging units 12101 to 12104. An imaging range 12111 represents the imaging range of the imaging unit 12101 attached to the front nose. Imaging ranges 12112 and 12113 respectively represent the imaging ranges of the imaging units 12102 and 12103 attached to the side mirrors. An imaging range 12114 represents the imaging range of the imaging unit 12104 attached to the rear bumper or the back door. For example, overlaying image data captured by the imaging units 12101 to 12104 offers an overhead image that looks down on the vehicle 12100.

At least one of the imaging units 12101 to 12104 may have a function of acquiring distance information. For example, at least one of the imaging units 12101 to 12104 may be a stereo camera including a plurality of image sensors or may be an image sensor that includes pixels for phase difference detection.

For example, the microcomputer 12051 can extract a 3-dimensional object traveling at a predetermined speed (for example, 0 or more km/h) in substantially the same direction as the vehicle 12100 as a preceding vehicle by particularly using a closest 3-dimensional object on a travel road of the vehicle 12100 by obtaining a distance to each 3-dimensional object within the imaging ranges 12111 to 12114 and a temporal change in the distance (a relative speed to the vehicle 12100) on the basis of distance information obtained from the imaging units 12101 to 12104. Further, the microcomputer 12051 can set an inter-vehicle distance to be ensured in advance before a preceding vehicle and perform automatic brake control (also including follow-up stop control) or automatic acceleration control (also including follow-up oscillation control). In this way, it is possible to perform cooperative control for the purpose of automatic driving or the like that allows the vehicle to autonomously travel irrespective of any operation of a driver.

For example, the microcomputer 12051 can classify and extract 3-dimensional object data regarding 3-dimensional objects as other 3-dimensional objects such as motorcycles, normal vehicles, large vehicles, pedestrians, and electric poles on the basis of the distance information obtained from the imaging units 12101 to 12104 and can use the other 3-dimensional objects to automatically avoid obstacles. For example, the microcomputer 12051 identifies obstacles around the vehicle 12100 as obstacles which can be viewed by a driver of the vehicle 12100 and obstacles which are difficult to view. Then, the microcomputer 12051 can determine a collision risk indicating a danger of collision with each obstacle and output a warning to the driver via the audio speaker 12061 or the display unit 12062 in a situation in which there is a collision possibility since the collision risk is set to be equal to or greater than a set value or can perform driving assistance for collision avoidance by performing forced deceleration or avoidance steering iv via the drive line control unit 12010.

At least one of the imaging units 12101 to 12104 may be an infrared camera that detects infrared light. For example, the microcomputer 12051 can recognize a pedestrian by determining whether or not there is the pedestrian in captured images of the imaging units 12101 to 12104. The pedestrian can be recognized, for example, in a procedure in which feature points are extracted in the captured images of the imaging units 12101 to 12104 serving as infrared cameras and a procedure in which a series of feature points indicating a contour of an object are subjected to a pattern matching process to determine whether or not there is the pedestrian. The microcomputer 12051 determines that there is the pedestrian in the captured images of the imaging units 12101 to 12104. When the pedestrian is recognized, the audio and image output unit 12052 controls the display unit 12062 such that a rectangular contour line for emphasis is superimposed to be displayed on the recognized pedestrian. In addition, the audio and image output unit 12052 controls the display unit 12062 such that an icon or the like indicating the pedestrian is displayed at a desired position.

An example of the vehicle control system to which the technology according to the present disclosure can be applied has been described above. The technology according to the present disclosure can be applied to the imaging unit 12031 or the like within the above-described configuration. By applying the technology according to the present disclosure to the imaging unit 12031 or the like, it is possible to create a natural HDR image even in the case where a moving object is included in a photographic subject.

3. Conclusion

As having described in the above, according to the embodiment of the present disclosure, at the time of creating an HDR image with an expanded dynamic range by synthesizing a plurality of images, the sensor module 100 is provided that selects a frame to be used as a short accumulation image correspondingly to an exposure ratio.

The sensor module 100 according to the embodiment of the present disclosure creates the first image by performing exposing to pixels with the first exposure by the first exposure time, and creates the second image by performing exposing to pixels with the second exposure by the second exposure time in succession to the first image. When synthesizing a synthesized image in which the first image and the second image has been synthesized and a selected image that is selected from either the first image or the second image, the sensor module 100 according to the embodiment of the present disclosure switches over an image to be selected as a selected image at a boundary of a time point when a relationship between the first exposure time and the second exposure time has satisfied a predetermined condition.

By having such a constitution, at the time of creating an HDR image, by selecting a frame to be used as a short accumulation image correspondingly to an exposure ratio, the sensor module 100 according to the embodiment of the present disclosure can create an HDR image such that a photographic subject does not become unnatural even in a case of imaging a photographic subject with movement.

It may not be necessary to chronologically execute respective steps in the processing, which is executed by each device of this specification, in the order described in the sequence diagrams or the flow charts. For example, the respective steps in the processing which is executed by each device may be processed in the order different from the order described in the flow charts, and may also be processed in parallel.

Furthermore, it becomes possible to generate a computer program which makes a hardware device, such as a CPU, a ROM, and a RAM incorporated in each device demonstrate the functions equivalent to the configurations of the above described devices. In addition, it becomes also possible to provide a storage medium which stores the computer program. In addition, respective functional blocks shown in the functional block diagrams may be constituted from hardware devices or hardware circuits so that a series of processes may be implemented by the hardware devices or hardware circuits.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
An imaging control apparatus including:
a control section that creates a first image by performing exposing to a pixel with first exposure by a first exposure time and creates a second image by performing exposing to a pixel with second exposure by a second exposure time in succession to the first image; and
a synthesizing section that synthesizes a synthesized image in which the first image and the second image have been synthesized and a selected image selected from either the first image or the second image,
in which the control section decides the first exposure time and the second exposure time such that an image to be selected as the selected image in the synthesizing section is switched over on a basis of an exposure ratio being a ratio of an exposure time of the synthesized image and an exposure time of the selected image.

(2)
The imaging control apparatus according to (1), in which the control section performs exposing to the pixel on a condition that an idle time is not put in between the first exposure and the second exposure.

(3)
The imaging control apparatus according to (1) or (2), further including:
an output section that outputs at least any one of an image synthesized in the synthesizing section and the selected image,
in which the output section outputs only the selected image in a case where a read time of the first exposure and the second exposure time overlap with each other in terms of time.

(4)
The imaging control apparatus according to claim 1, in which the first exposure time is the second exposure time or less.

The imaging control apparatus according to any of (1) to (3)

(5)
The imaging control apparatus according to (4), in which in a case where the exposure ratio is larger than two, the first image is selected as the selected image, and in a case where the exposure ratio is smaller than two, the second image is selected as the selected image.

(6)
The imaging control apparatus according to any of (1) to (5), in which when an image to be selected as the selected image in the synthesizing section is switched over, the control section decides the first exposure time and the second exposure time so as to cause hysteresis.

(7)
The image processing apparatus according to any of (1) to (6), in which three semiconductor substrates including a first semiconductor substrate, a second semiconductor substrate, and a third semiconductor substrate are stacked,
on the first semiconductor substrate, at least the pixel is formed,
on the second semiconductor substrate, a memory section that memorizes the first image and the second image is formed, and
on the third semiconductor substrate, at least the control section is formed.

(8)
The image processing apparatus according to (7), in which the second semiconductor substrate is disposed between the first semiconductor substrate and the third semiconductor substrate.

(9)
The image processing apparatus according to (7), in which the third semiconductor substrate is disposed between the first semiconductor substrate and the second semiconductor substrate.

(10)
An imaging control method including:
creating a first image by performing exposing to a pixel with first exposure by a first exposure time and creating a second image by performing exposing to a pixel with second exposure by a second exposure time in succession to the first image;
synthesizing a synthesized image in which the first image and the second image have been synthesized and a selected image selected from either the first image or the second image; and
deciding the first exposure time and the second exposure time such that an image to be selected as the selected image is switched over on a basis of an exposure ratio being a ratio of an exposure time of the synthesized image and an exposure time of the selected image.

(11)
A computer program to make a computer execute:
creating a first image by performing exposing to a pixel with first exposure by a first exposure time and creating a second image by performing exposing to a pixel with second exposure by a second exposure time in succession to the first image;
synthesizing a synthesized image in which the first image and the second image have been synthesized and a selected image selected from either the first image or the second image; and
deciding the first exposure time and the second exposure time such that an image to be selected as the selected image is switched over on a basis of an exposure ratio being a ratio of an exposure time of the synthesized image and an exposure time of the selected image.

(12)
An electronic device including:
the imaging control apparatus according to any of (1) to (10).

REFERENCE SIGNS LIST

10 electronic device
100 sensor module

The invention claimed is:

1. An imaging control apparatus, comprising:
circuitry configured to:
expose a first pixel based on a first exposure time, wherein the first pixel has a first exposure and is associated with the imaging control apparatus;
create a first image based on the exposed first pixel;
expose a second pixel based on a second exposure time, wherein the second pixel has a second exposure and is associated with the imaging control apparatus;
create a second image in succession to the first image based on the exposed second pixel;
synthesize a first synthesized image and a selected image, wherein
the first synthesized image is associated with synthesization of the first image and the second image, and
the selected image corresponds to one of the first image or the second image; and
determine a third exposure time and a fourth exposure time to switch over the selected image, wherein
the third exposure time and the fourth exposure time are determined based on a first exposure ratio, and
the first exposure ratio is a ratio of an exposure time of the first synthesized image and an exposure time of the selected image.

2. The imaging control apparatus according to claim 1, wherein the circuitry is further configured to expose the first pixel and the second pixel based on an idle time between the first exposure and the second exposure being zero.

3. The imaging control apparatus according to claim 1, wherein the circuitry is further configured to:
output at least one of a second synthesized image or the selected image, wherein the second synthesized image is associated with the synthesization of the first synthesized image and the selected image; and
output the selected image based on an overlap of a read time of the first exposure and the second exposure time.

4. The imaging control apparatus according to claim 1, wherein the first exposure time is equal to or less than the second exposure time.

5. The imaging control apparatus according to claim 4, wherein
the selected image corresponds to the first image based on a second exposure ratio that is larger than two, and
the selected image corresponds to the second image based on the second exposure ratio that is smaller than two.

6. The imaging control apparatus according to claim 1, wherein
the circuitry is further configured to determine the first exposure time and the second exposure time to generate hysteresis to switch over the selected image, and
the hysteresis is associated with the first exposure ratio.

7. The imaging control apparatus according to claim 1, further comprising a first semiconductor substrate, a second semiconductor substrate, and a third semiconductor substrate, wherein
the first semiconductor substrate, the second semiconductor substrate, and the third semiconductor substrate are stacked,
the first semiconductor substrate includes the first pixel and the second pixel,
the second semiconductor substrate includes a memory section, and
the memory section is configured to store the first image and the second image.

8. The imaging control apparatus according to claim 7, wherein the second semiconductor substrate is between the first semiconductor substrate and the third semiconductor substrate.

9. The imaging control apparatus according to claim 7, wherein the third semiconductor substrate is between the first semiconductor substrate and the second semiconductor substrate.

10. An imaging control method, comprising:
in an imaging control apparatus;
exposing a first pixel based on a first exposure time, wherein the first pixel has a first exposure and is associated with the imaging control apparatus;
creating a first image based on the exposed first pixel;
exposing a second pixel based on a second exposure time, wherein the second pixel has a second exposure and is associated with the imaging control apparatus;
creating a second image in succession to the first image based on the exposed second pixel;
synthesizing a synthesized image and a selected image, wherein
the synthesized image is associated with synthesization of the first image and the second image, and
the selected image corresponds to one of the first image or the second image; and
determining a third exposure time and a fourth exposure time to switch over the selected image, wherein
third exposure time and the fourth exposure time are determined based on an exposure ratio, and
the exposure ratio is a ratio of an exposure time of the synthesized image and an exposure time of the selected image.

11. A non-transitory computer-readable medium having stored thereon, computer-executable instructions which, when executed by a processor, cause an imaging control apparatus to execute operations, the operations comprising:
exposing a first pixel based on a first exposure time, wherein the first pixel has a first exposure and is associated with the imaging control apparatus;
creating a first image based on the exposed first pixel;

exposing a second pixel based on a second exposure time, wherein the second pixel has a second exposure and is associated with the imaging control apparatus;

creating a second image in succession to the first image based on the exposed second pixel;

synthesizing a synthesized image and a selected image, wherein the synthesized image is associated with synthesization of the first image and the second image, and the selected image corresponds to one of the first image or the second image; and determining a third exposure time and a fourth exposure time to switch over the selected image, wherein third exposure time and the fourth exposure time are determined based on an exposure ratio, and the exposure ratio is a ratio of an exposure time of the synthesized image and an exposure time of the selected image.

12. An electronic device, comprising:

an imaging control apparatus that includes circuitry configured to:

expose a first pixel based on a first exposure time, wherein the first pixel has a first exposure and is associated with the imaging control apparatus;

create a first image based on the exposed first pixel;

expose a second pixel based on a second exposure time, wherein the second pixel has a second exposure and is associated with the imaging control apparatus;

create a second image in succession to the first image based on the exposed second pixel;

synthesize a synthesized image and a selected image, wherein the synthesized image is associated with synthesization of the first image and the second image, and the selected image corresponds to one of the first image and the second image; and determine a third exposure time and a fourth exposure time to switch over the selected image, wherein the third exposure time and the fourth exposure time are decided based on an exposure ratio, and the exposure ratio is a ratio of an exposure time of the synthesized image and an exposure time of the selected image.

\* \* \* \* \*